US007193532B1

(12) United States Patent
Goldstein

(10) Patent No.: US 7,193,532 B1
(45) Date of Patent: Mar. 20, 2007

(54) MEANS AND METHOD OF PROVIDING INFORMATION TO A LAW ENFORCEMENT OFFICER REGARDING A STOPPED VEHICLE

(76) Inventor: Michael T. Goldstein, 11833 Shallowbrook Dr., St. Louis, MO (US) 63146

(*) Notice: Subject to any disclaimer, the term of this patent is extended or adjusted under 35 U.S.C. 154(b) by 146 days.

(21) Appl. No.: 11/118,195

(22) Filed: May 2, 2005

(51) Int. Cl.
*H04B 14/00* (2006.01)
(52) U.S. Cl. ....................................... 340/999; 434/365
(58) Field of Classification Search ................. 340/999
See application file for complete search history.

(56) References Cited

U.S. PATENT DOCUMENTS 5,097,349 A 3/1992 Nomura et al.
5,459,304 A * 10/1995 Eisenmann ................. 235/380
5,467,329 A 11/1995 Hashimoto
5,619,731 A 4/1997 Jenkins et al.
5,729,741 A 3/1998 Liaguno et al.
6,052,068 A * 4/2000 Price R-W et al. ......... 340/933
6,224,109 B1 * 5/2001 Yang ........................... 283/77
6,317,779 B1 11/2001 Gile et al.
6,338,405 B1 1/2002 Yoerg et al.
7,079,007 B2 * 7/2006 Siegel et al. ............... 340/5.52
2005/0278082 A1 * 12/2005 Weekes ......................... 701/1

* cited by examiner

*Primary Examiner*—Daniel Wu
*Assistant Examiner*—Eric M. Blount
(74) *Attorney, Agent, or Firm*—Donald R. Schoonover

(57) ABSTRACT

A law enforcement officer involved in a traffic stop is provided with a compact disc containing data and a software program which permits the officer to obtain information regarding possible hiding places in a vehicle that has been stopped. The information involves locations as well as methods and instructions for accessing the hiding places. The information is available in a central data base that can be accessed by a computer in the officer's car and can be updated as needed by manufacturers as well as other officers.

7 Claims, 2 Drawing Sheets

MEANS AND METHOD OF PROVIDING INFORMATION TO A LAW ENFORCEMENT OFFICER REGARDING A STOPPED VEHICLE

BACKGROUND OF THE INVENTION

1. Field of the Invention

The present invention relates to the general art of law enforcement, and to the particular field of information used in law enforcement.

2. Description of the Related Art

Traffic stops made by law enforcement officers have always presented numerous problems for the officers. These problems range from actual physical danger to legal problems associated with probable cause.

Therefore, there is a need for a means and a method for improving the efficiency and effectiveness of a law enforcement traffic stop.

As criminals become more dangerous and more skilled, all of the problems associated with traffic stops are exacerbated. In some instances, such as might be the case with terrorists, the stop may be deadly for, not only the officer, but for those in the immediate vicinity of the stop as well. One reason for this is the criminal or terrorist may hide illegal items, including explosives, drugs, firearms, or the like, in various locations in the vehicle. Most law enforcement officers rely on their own knowledge and experience in determining if a search of a stopped vehicle is warranted. Further, once a search is initiated, most officers must rely on their own knowledge and experience in determining where to search and how to gain access to the areas being searched.

This is not efficient because criminals are always seeking new ways to avoid detection, and one such way will be to find new hiding places in a vehicle. This can create great problems for the officer. For example, he may miss a hiding place and thus miss illegal items, or he may not be able to gain access to a particular hiding place. Not only is this inefficient, it can be dangerous.

Therefore, there is a need for a means and a method for improving the efficiency and effectiveness of a law enforcement traffic stop by providing information to an officer regarding potential hiding places on the stopped vehicle and providing information on the most efficient and effective ways and means for gaining access to such hiding places.

One very effective method of improving the efficiency of a search of a stopped vehicle will be to permit a law enforcement officer to be able to use a pool of knowledge. Thus, it would increase the efficiency of traffic stops if a law enforcement officer could contact others regarding the stopped vehicle and tap into their knowledge.

Therefore, there is a need for a means and a method for improving the efficiency and effectiveness of a law enforcement traffic stop by providing a means for a law enforcement officer to communicate with others concerning the stopped vehicle.

The most effective knowledge is generally the most up-to-date knowledge. Therefore, in the traffic stop situation of interest to this disclosure, it will be most helpful if data associated with each land vehicle is continually updated. This will permit the data base to take advantage of all of the newest information for each traffic stop whereby any new tricks tried by criminals will quickly be made known to all law enforcement officers.

Therefore, there is a need for a means and a method for improving the efficiency and effectiveness of a law enforcement traffic stop by providing a data base that is updated on a continuous or periodic basis.

Any data and information known to law enforcement should not be available to others. Therefore, any data associated with hiding places on land vehicles should be available only to authorized personnel.

Therefore, there is a need for a means and a method for improving the efficiency and effectiveness of a law enforcement traffic stop which is available only to authorized personnel.

PRINCIPAL OBJECTS OF THE INVENTION

It is a main object of the present invention to provide a means and a method for alerting a law enforcement officer of potential hiding places in a motor vehicle before the officer even approaches the stopped vehicle.

It is another object of the present invention to provide a means and a method for alerting a law enforcement officer of potential hiding places in a motor vehicle and provide instructions on the most effective ways of finding and opening those hiding places before the officer even approaches the stopped vehicle.

It is another object of the present invention to provide a means and a method for alerting a law enforcement officer of potential hiding places in a motor vehicle and keeping the officer alerted to any new areas that may have been used.

It is another object of the present invention to provide a means and a method for alerting a law enforcement officer of potential hiding places in a motor vehicle which can be updated by car manufacturers as new models are released each year.

It is another object of the present invention to provide a means and a method for alerting a law enforcement officer of potential hiding places in a motor vehicle which permits an officer to communicate with other officers for updated information and tips that may have been learned by an officer during a search and which may not be evident from the data in a data base.

It is another object of the present invention to provide a means and a method for alerting a law enforcement officer of potential hiding places in a motor vehicle which can be used with any operating system.

It is another object of the present invention to provide a means and a method for alerting a law enforcement officer of potential hiding places in a motor vehicle which can be used on a laptop computer or other such computer that might be available to law enforcement officers.

SUMMARY OF THE INVENTION

These, and other, objects are achieved by a method of providing information to a law enforcement officer during a traffic stop about possible hiding places in the stopped vehicle where illegal items might be hidden. The method includes a compact disc and a computer program that link a computer in the officer's car to a data base which contains data pertinent to hiding places and access methods and tools for all makes and models of cars currently on the roads in the United States. The data base is built by accessing manufacturer data as well as information provided by other officers.

Using the method embodying the present invention will permit a law enforcement officer to have a detailed knowledge of a stopped vehicle before he even approaches the vehicle so he will be aware of all the areas of the stopped vehicle in which illegal or dangerous items might be hidden. Such knowledge will assist the officer with his stop and may make the stop safer.

BRIEF DESCRIPTION OF THE DRAWING FIGURES

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a method for assisting law enforcement officers scope out a vehicle for possible hiding spots where illegal items can be stored.

Figure 1:
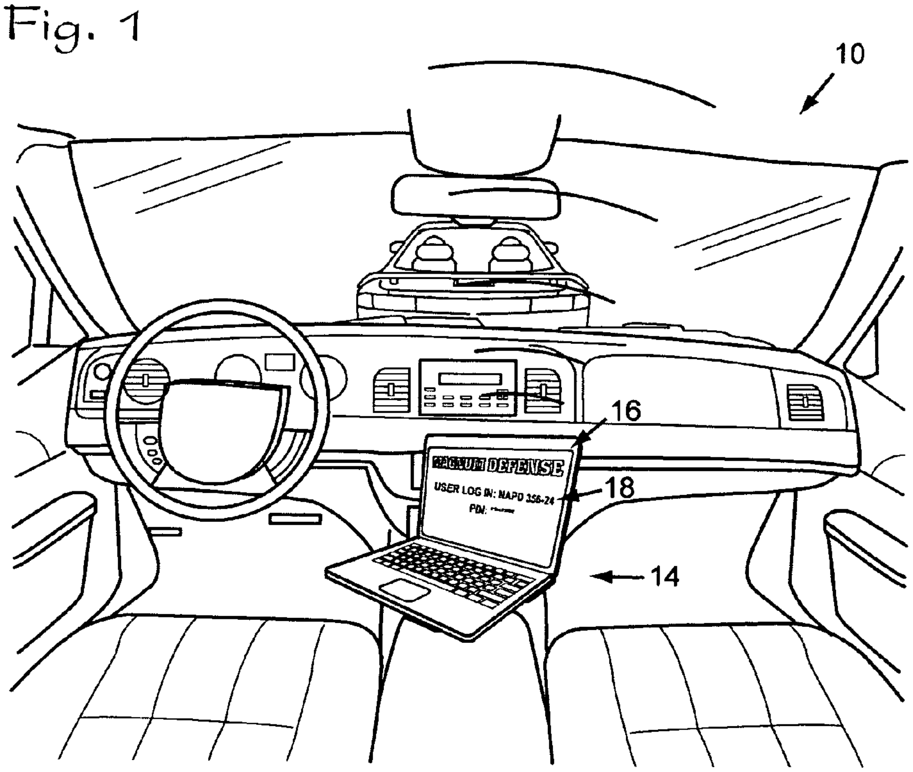
FIG. 1 is a sketch showing a setup in a law enforcement vehicle that is used in carrying out the method embodying the present invention.
Figure 2:
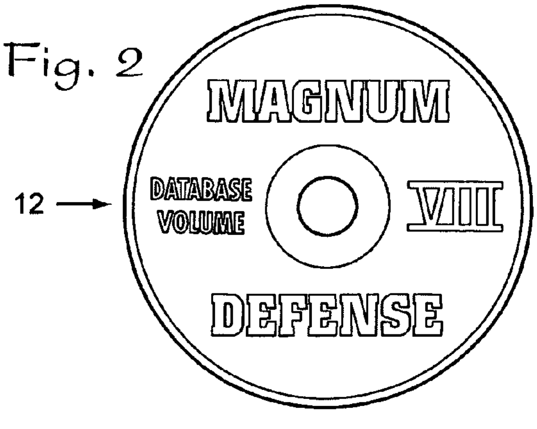
FIG. 2 illustrates a compact disc on which data used in the method of the present invention is stored.
Figure 3:
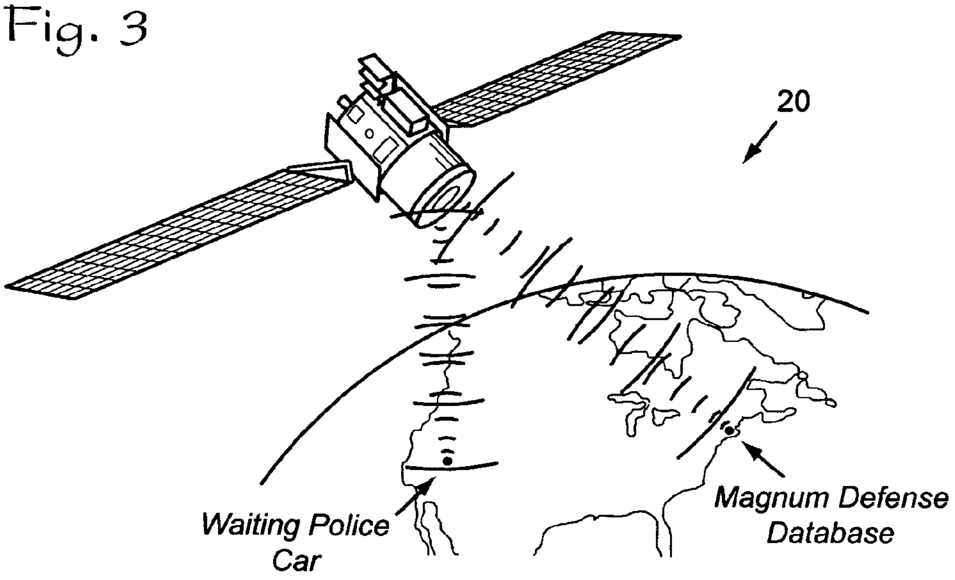
FIG. 3 illustrates a wireless step in communication between a law enforcement vehicle and a data base.
Figure 4:
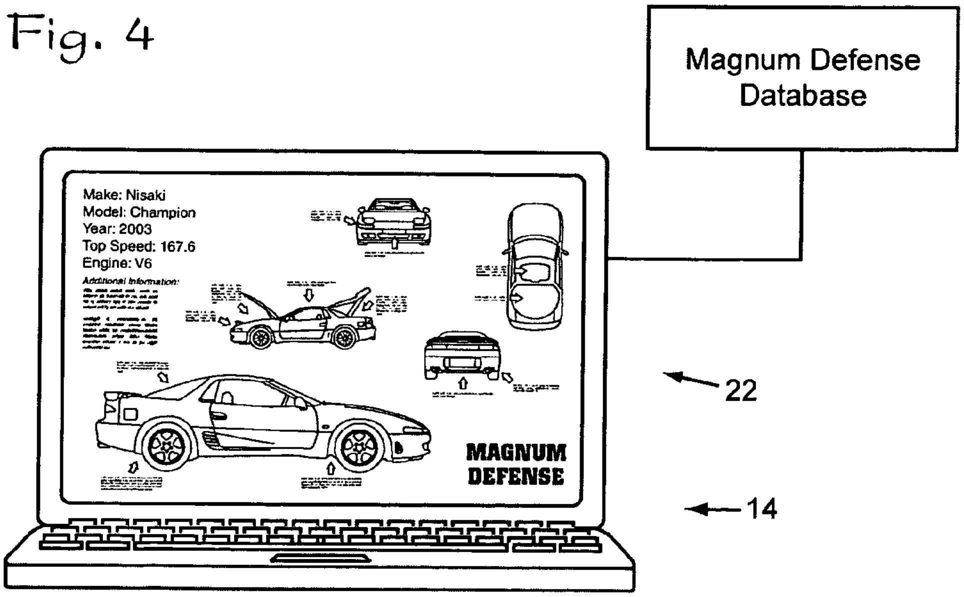
FIG. 4 illustrates a display for a particular type of vehicle.

The method is begun after a traffic stop is made and before an officer approaches the stopped vehicle. The officer has a set up 10, such as shown in FIG. 1, in his patrol car and loads a compact disc 12, such as shown in FIG. 2, into a computer 14 that is located onboard the patrol car. Software is loaded onto the computer and an interactive presentation 16 can be made. Each officer has a personal code and login password 18 which identifies the officer to the software and the method is continued by logging in. The software and the compact disc have data which identifies each hiding place and how to access the hiding place for each make and model of every vehicle presently on the road. This data can be stored in a central location and can be provided by manufacturers, other officers, and experts. The data can be constantly updated as new information is made available. The method is continued by inputting the data for the selected vehicle. The computer in the officer's patrol car can access the central data bank via a wireless connection 20, such as indicated in FIG. 3, or the like. Wireless connections of this sort are well known to those skilled in the art, and the particular form of connection is not important to the present invention and thus will not be discussed in detail.

Once an officer has logged on, he then accesses an index which categorizes the make year dating back to as early as the 1970's and the model of the car. Next, a three-dimensional view of the selected car 22 is displayed on the computer screen in the officer's car, including possible modifications to the body, exhaust and wheels and a detailed 360° rotating picture of the car. Once the correct car is identified, the officer can either read the caption describing the indicated part, or click on a picture of each part of the car, including the interior, which is broken down into specific regions.

These specific regions include the exterior, front, rear, wheels, gas cap, underneath body, the trunk, and inside the hood. The interior can include the front dash, fuse holders, safety belts, driver seat, passenger seats, rear seats, center console, the gear box (if manual), the rear view mirror, the glove box, the door panels, speaker compartments, flooring, and all other places that need to be examined depending on the make/model/year of the car. Any other areas can also be included and the just-listed areas are to be considered as examples only and not limitations.

Once a picture is clicked, a description of the part and any information on removing or accessing the part is displayed for the officer. The displayed information includes the possible hiding spots in the region, how much space is available within the part to hide any illegal substances or objects, how to get into that spot and what tools are needed.

Also, the method can include the officer using the program to interact with other officers and hooking up to a network/server/Internet data base that will have a registered login section where the officer can chat and interact with other officers and have the ability to post any comments or questions on a message board. The program will also give telephone numbers of the major car companies and information so if there is any additional information needed about the car, it can be readily accessed.

The method further includes updating the program each year as new cars, trucks and SUVs are manufactured. This can be possible by either setting up an account through the website or by registering it, with the officer's local account being setup by the law enforcement station. The program should be compatible with all Microsoft based programs and will work on all personal computers and laptops.

The program has a user help index with specific instructions on installation, networking, and actual usage of the program. There is also contact information and an ability to download patches and upgrades.

The program will also include published articles as well as tips on do's and don'ts for searches.

It is understood that while certain forms of the present invention have been illustrated and described herein, it is not to be limited to the specific forms or arrangements of parts described and shown.

What is claimed and desired to be covered by Letters Patent is:

1. A method of assisting a law enforcement officer during a traffic stop comprising:

a) storing data regarding each of a plurality of land vehicles, the data including
   (1) locations of potential hiding places for illegal items,
   (2) a method of accessing each hiding place, and
   (3) tools required to access each hiding place;

b) updating the stored data on a periodic basis;

c) providing a means for accessing the stored data from a law enforcement vehicle; and d) inputting a personal code and a login password to access the data from the vehicle where upon a traffic stop is made, the law enforcement officer accesses the data to locate potential hiding places.

2. The method as described in claim 1 wherein the step of storing data includes storing pictures of each location.

3. The method as described in claim 2 wherein the step of storing data further includes storing each picture in a manner that will permit display and rotation of the display.

4. The method as described in claim 1 wherein the step of storing data includes storing a description of the physical characteristics of each location.

5. The method as described in claim 1 further including a step of permitting communication between the law enforcement vehicle and other law enforcement entities.

6. The method as described in claim 1 wherein the step of updating the stored data includes receiving data from car manufacturers.

7. The method as described in claim 2 wherein the step of storing data further includes storing the data on a compact disc.

* * * * *